US009509222B2

(12) United States Patent
Hart et al.

(10) Patent No.: US 9,509,222 B2
(45) Date of Patent: Nov. 29, 2016

(54) POWER CONVERSION SYSTEM

(71) Applicant: Control Techniques Limited, Newtown (GB)

(72) Inventors: Simon David Hart, Newtown (GB); Stephen Berry, Newtown (GB); Richard Mark Wain, Newtown (GB); Dhananjay Dattatray Kapatkar, Pune (IN); Dilesh Arvind Raut, Pune (IN)

(73) Assignee: CONTROL TECHNIQUES LIMITED, Newtown (GB)

( * ) Notice: Subject to any disclaimer, the term of this patent is extended or adjusted under 35 U.S.C. 154(b) by 807 days.

(21) Appl. No.: 13/887,851

(22) Filed: May 6, 2013

(65) Prior Publication Data

US 2013/0313905 A1 Nov. 28, 2013

(30) Foreign Application Priority Data

May 4, 2012 (GB) .................................. 1207988.5
May 6, 2013 (IN) .......................... 1629/MUM/2013

(51) Int. Cl.
H02M 3/335 (2006.01)
H02J 3/14 (2006.01)

(52) U.S. Cl.
CPC ..... H02M 3/33561 (2013.01); H02M 3/33569 (2013.01); Y10T 307/406 (2015.04)

(58) Field of Classification Search
CPC ........... H02M 3/335; H02M 3/33561; H02M 200/009; H02M 1/096; H02J 3/14
See application file for complete search history.

(56) References Cited

U.S. PATENT DOCUMENTS

| 6,061,252 | A | 5/2000 | Hosotani | |
|---|---|---|---|---|
| 6,650,028 | B1 | 11/2003 | Cornelius | |
| 6,774,507 | B1 * | 8/2004 | Byers | H02J 9/062 307/125 |
| 6,833,635 | B2 * | 12/2004 | Kippley | H02J 1/10 307/83 |

* cited by examiner

Primary Examiner — Jared Fureman
Assistant Examiner — Rafael Pacheco
(74) Attorney, Agent, or Firm — Harness, Dickey & Pierce, P.L.C.

(57) ABSTRACT

The present disclosure relates to a power conversion system comprising a transformer comprising first, second, and third inductive coupling elements, a first power supply arranged to provide a voltage across the first coupling element, a second power supply arranged to provide a voltage across the second coupling element, an output arranged to receive a voltage from the third coupling element. In use, the voltage across the first coupling element and the voltage across the second coupling element are arranged to induce a voltage in the third coupling element. The system also comprises a control arrangement arranged to independently control the operation of the first and second power supplies.

19 Claims, 5 Drawing Sheets

POWER CONVERSION SYSTEM

CROSS-REFERENCE TO RELATED APPLICATIONS

This application claims the benefit and priority of Great Britain Patent Application No. 1207988.5 filed May 4, 2012 and Indian Patent Application No. 1629/MUM/2013 filed May 6, 2013. The entire disclosures of each of the above applications are incorporated herein by reference.

FIELD OF INVENTION

The invention relates to the field of power conversion technology. More specifically, but not exclusively, embodiments of the invention relate to power conversion systems having multiple input power sources.

BACKGROUND TO THE INVENTION

There is a common need in electrical and electronic devices to provide a voltage step-down between a power source and a load. This is particularly true for devices that receive power from a standard power source, such as mains electricity or a standard battery, but have a lower operating voltage compared to that of the power source.

While there are various different means for providing a voltage step-down, Switching-mode power supply (SMPS) circuits are generally seen as the technology of choice. SMPSs can regulate output voltage and/or current by switching electrical storage elements, such as inductors and/or capacitors, into and out of different electrical configurations at an output stage of the SMPS. It is also common to incorporate transformers into SMPS output stages so that the voltage step-down is in-part performed by the SMPS and in-part performed by the transformer. Such arrangements are advantageous because the SMPS provides tightly-regulated control of the output voltage and the transformer provides electrical isolation between the input and the output. The combined use of the SMPS and transformer also allows for a relatively small transformer to be used.

It is common in various high-power systems to provide a main power source, which is arranged for delivering high powers to a load, and a secondary extra-low voltage (ELV) source, which is arranged for delivering a safe voltage, generally no more than 24V to a load. However, such known systems suffer from various problems. For example, the systems are often large and complex because two different types of power source need to be utilized. High voltage mains power and 24V ELV for backup power. In addition, when such systems switch between power sources it is common for there to be a brief loss of system output power, which is extremely undesirable.

SUMMARY OF INVENTION

Embodiments of the present invention attempt to mitigate at least some of the above-mentioned problems.

In accordance with an aspect of the invention there is provided a system as defined in claim 1 of the appended claims. Features of embodiments are defined in the dependent claims.

Embodiments of the invention relate to a dual primary SMPS having individual primary control.

Some embodiments of the invention provide a system which simplifies the operation of the system when running in a back-up mode.

In certain embodiments of the invention a power conversion system is provided having a plurality of power sources, wherein the system includes a control system arranged to switch between the plurality of power sources without stopping supply of power to an output of the system.

Embodiments of the invention provide a system arranged to utilise low levels of energy when in standby. Furthermore, embodiments of the invention provide a system that, if a main power supply drops to a low level then the system still operates with a reduced output power via a low level power supply. In such embodiments lower losses are provided when the low level power supply is utilised.

Some embodiments of the invention provide a power supply system arrange to provide a wider range of supply voltages.

In certain embodiments of the invention a dual primary SMPS is provided which is low cost and high performance, and allows the system to operate over a very wide range of supply voltages.

Embodiments of the invention provide a control system arranged to sequence a plurality of power supplies.

Furthermore, some embodiments of the invention relate to one or more methods for controlling a power conversion system. More specifically, embodiments of the invention relate to one or more methods for a control arrangement to control a plurality of power supplies of a power conversion system.

In some embodiments of the invention a power conversion system is provided comprising first and second power supplies, each connected to one or more outputs via a transformer via respective SMPSs.

The charging of the DC bus capacitor may be avoided when the system is working on the back-up SMPS.

Unnecessary heating of the main SMPS switching device may be avoided when the system is working on the back-up SMPS, and vice versa.

Provision may be made to reduce the noise in the microcontroller power supply to assist the analog to digital conversion.

BRIEF DESCRIPTION OF THE DRAWINGS

Exemplary embodiments of the invention shall now be described with reference to the drawings in which.

Throughout the description and the drawings, like reference numerals refer to like parts.

SPECIFIC DESCRIPTION

Figure 1:
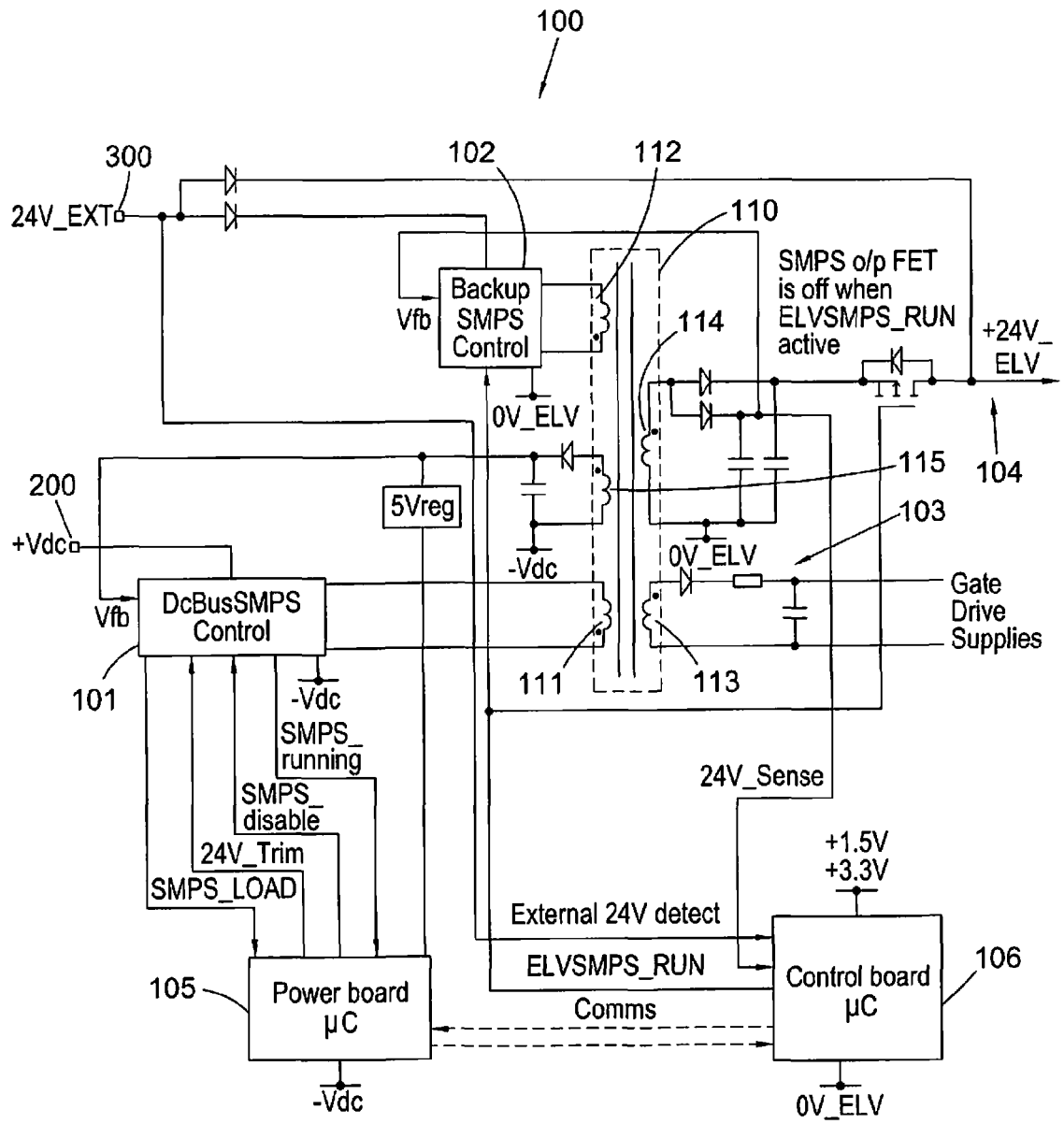
FIG. 1 is a circuit diagram of a dual-source SMPS system.

FIG. 1 shows a dual-source SMPS system 100 utilising a flyback converter arrangement.

The system 100 is arranged to receive power from a first power source 200 and a second power source 300. The first power source 200 is a main high voltage DC bus 3-phase AC 400V (560V DC) supply that acts as a primary source of power for the system 100. In other embodiments, this power source may be at a different voltage, for example 3-phase AC 575V)800V DC) or 3-phase AC 200V (280V DC). The second power source 300 is a back-up 24V DC ELV power supply.

The system 100 is arranged to deliver the power received from one or both of the power sources 200, 300 to an output. In particular, the system 100 has a main output 104 and auxiliary output 103 which, in the present embodiment, supplies gate drive supplies for the inverter of a variable speed drive, which has an output voltage determined by the functional components of the system 100, and a 24V extra-low voltage (ELV) output.

The system 100 comprises a main SMPS 101, which receives power from the main power source 200, and a back-up SMPS 102, which receives power from the back-up power source 300. The voltage received by the back-up power SMPS from the back-up power source 300 is referenced to 0V. Both the main and back-up SMPS circuits 101, 102 include pulse-width modulation functionality arranged to thereby provide a reduced voltage output in accordance with a duty cycle associated with the respective SMPS. The output of each of the main and back-up SMPS circuits 101, 102 is provided across a respective winding 111, 112 of a transformer 110. The transformer 110 also includes two output windings, a main output winding 114, which provides a main voltage output to the main output circuit 104 associated with the main output of the system, and an auxiliary output winding 113, which provides an output voltage to the gate drive of the inverter of the variable speed drive. The main output circuit comprises a rectifier and capacitor circuit arranged to rectify and smooth the main output voltage. The auxiliary output circuit also comprises a rectifier diode, a resistor and a capacitor. The rectifier and capacitor create the smoothed dc. The resistor provides a current limit in the example application, but this is optional.

Each SMPS 101, 102 receives a feedback voltage control signal Vfb from a respective system output. This control signal Vfb is then used to vary the characteristics of the SMPS in order to provide a stable output voltage. The main SMPS includes a voltage sense circuit including a winding arranged to determine the voltage induced in the output winding 114 and therefore provide the feedback voltage control signal Vfb. Vfb is used by the controller 101 to compare with a reference thus creating an error signal that is used to alter the duty cycle of the switching of TR1 in FIG. 5. The back-up SMPS operates in a similar way to the main SMPS but the feedback control signal Vfb comes from a direct feedback line connected to the ELV output circuit The operation of the main SMPS 101 is controlled by an analogue control chip for the cycle by cycle control of TR1 and, more slowly by the Power Board microcontroller, PμC, 105. The operation of the back-up SMPS 102 is similarly controlled by an analogue control chip for fast control and, more slowly by the Control Board microcontroller, CμC, 106. The CμC is arranged to control the operation of the PμC via a communication link between the CμC and PμC. The microcontrollers 105, 106 are arranged to control which of the main SMPS 101 and back-up SMPS 102 drives the system 100. The operation of the microcontrollers 105, 106 is discussed in more detail later in this document.

A current bleed is provided from each of the power sources to start each SMPS 101, 102 before the bootstrap winding 115 takes over and provides power for 101 to keep it running. The control boards, and any peripheral devices such as a cooling fan, may be fed directly from the back-up power supply 300, rather than via whichever of the SMPSs is driving the system. This allows the system 100, and in particular the back-up SMPS 102 to be as small and cheap as possible.

The operation of the system 100 as shown in FIG. 1 will now be described in detail. In particular, the way in which the system utilises the two SMPS to provide the required output voltages shall be considered in detail. Firstly, the general operation of each component of the system 100 shall be considered, and then the operation of the system when the main SMPS 101 drives the system 100 and when the back-up SMPS 102 drives the system 100 shall be considered.

The main SMPS 101 is arranged to be powered-up by default when the system initiates. This is partly because the main power source 200 is the normal power source for the system 100 during normal operation. Consequently, an SMPS_disable signal from the PμC is inactive when the system initiates, for example during a microcontroller reset operation. The back-up SMPS 102 is OFF by default. So at start-up or reset the back-up SMPS 102 is OFF and an ELVSMPS_RUN signal from the CμC 106 to the back-up SMPS 102 is inactive during reset.

The main SMPS 101 is arranged to remain active unless certain circumstances arise. In most circumstances the back-up SMPS 102 is arranged to drive the system 100 when the main SMPS cannot. Those circumstances in which the back-up SMPS drives the system 100 are discussed below.

The back-up power supply 300 is used as a back-up to the main power supply 200 to keep the microcontrollers 105, 106 of the system powered-up when the main supply 200 is removed. This operation is therefore useful for system control.

In addition, the back-up power supply 300 is used to commission the drive when the main power supply 200 is not available.

The back-up power supply is also used when the main power supply input 200 has a voltage too low to run main power supply 101. In such circumstances, if power is supplied from the back-up power supply 300 and if low voltage DC operation is enabled then a 24V output will drive all the ELV power requirements of the system 100. The gate drives and any circuits referenced to the main power supply 200 are fed from the back-up SMPS 102.

In order to keep the gate drives running in low voltage DC mode, either the backup SMPS 102 or the main SMPS 101 must be running at all times. Although the SMPSs must be capable of running with no damage when both SMPSs are running at the same time, there is a risk that the gate drive supplies may be lost. To avoid losing the gate drives, the microcontrollers are arranged so that whenever the low-voltage mode is to be used, the main SMPS is disabled. The backup power supply 300 must therefore provide 24V with enough power to run the whole drive.

The back-up power supply 300 can also used to supplement the main power supply 200 when the system 100 is driving energy-hungry loads if required. The current flow is from 300 to 104 via a diode. The backup SMPS 102 does not have to be activated.

The ELVSMPS_RUN signal therefore only goes high, in order to switch the back-up SMPS 1020N, when the main SMPS 101 is inactive. Since the ELVSMPS_RUN signal comes from the CμC, the user must feed the system with 24V from the back-up power source 300 in order to keep the CμC 106 running even though the main SMPS 101 is OFF.

There are also other circumstances in which the main SMPS 101 no longer drives the system 100, as discussed below.

The system monitors whether the output voltage of the system is within pre-determined operational limits, which are defined within the PμC. The pre-determined limits define the acceptable operating voltages of the full-power operation of the system 100, i.e. when the system is being powered by the main power supply 200 and main SMPS 101. However, if the main SMPS 101 is switched-off by the PμC 105 due to the required output voltage being out of the operating range of the main SMPS 101, the PμC 105 then turns OFF, and then the main SMPS 101 will turn back ON again because the startup bleed current from 200 re-energises the main SMPS controller 101. The turning OFF and ON of the main SMPS 101 results in a hiccup mode occurring if the ELV output is not present and the main output voltage, i.e. the voltage delivered to the gate drive supplies, is out of the predetermined range. A hardware circuit may be provided for preventing the main SMPS 101 from running if the main voltage source is too high.

In addition to the main SMPS 101 varying its duty cycle in accordance with the Vfb signal, as discussed previously, the main SMPS 101 is also arranged to vary its duty cycle when providing the ELV output. As such, the main SMPS 101 receives a 24V_Trim signal sent from the power board microcontroller 105. This signal allows the output voltage of the system to be increased by the main SMPS 101 based on an output voltage measured by the CμC. The 24V_Trim signal derives from a pulse-width modulation (PWM) signal sent from the PμC determined by the PμC in response to the measured ELV output voltage, 24V_Sense. In the main SMPS 101, the PWM signal switches a power FET ON and OFF, thereby setting the duty cycle of main SMPS 101. When ON, the main SMPS 101 is arranged to connect a resistor to shunt some of the feedback current to −Vdc. If the feedback signal is reduced, the main SMPS 101 increases the output voltage to compensate for this reduction. As the duty cycle associated with the PWM signal increases, the main SMPS 101 output voltage will increase.

The CμC 106 is arranged to monitor the 24V ELV output via the 24V_Sense signal, as mentioned above, and send this monitored voltage to the PμC 105. As mentioned above, this voltage is monitored for control of the main SMPS 101. However, the CμC 106 also monitors the external 24V supply in accordance with the External 24V detect signal to determine which supply 200, 300 to utilise. In accordance with the monitored supply voltage, the CμC 106 sends a message to the PμC 105 to disable the main SMPS 101 by comparing the monitored supply voltage with a threshold voltage. When the PμC 105 has confirmed that the main SMPS 101 has been instructed to switch-off via the communications link between the PμC 105 and the CμC 106, the CμC 106 instructs the back-up SMPS 102 to run by taking the ELVSMPS_RUN signal high.

The PμC 105 is arranged to take the SMPS_disable control signal high when the output voltage is determined to be outside a predetermined operating range or if instructed to do so by the CμC 106. Once the SMPS_disable control signal has been made high, the PμC 105 monitors the SMPS_running signal to determine if the main SMPS 101 has been disabled as instructed. Once confirmation of the disabling of the main SMPS 101 has been received the PμC 105 communicates this to the CμC 106 so that the back-up SMPS 101 can be enabled, if required. The PμC 105 is also arranged to generate the PWM 24V_Trim signal to increase the output voltage, if required, as discussed above in respect of the main SMPS 101. Furthermore, the PμC 105 monitors an SMPS_LOAD signal, which is indicative of whether or not the main SMPS 101 is overloaded. Hence, the PμC 105 can detect whether the system is being over-loaded. If overload is detected, the SMPS is shut-down using the SMPS-disable signal.

Figure 2:
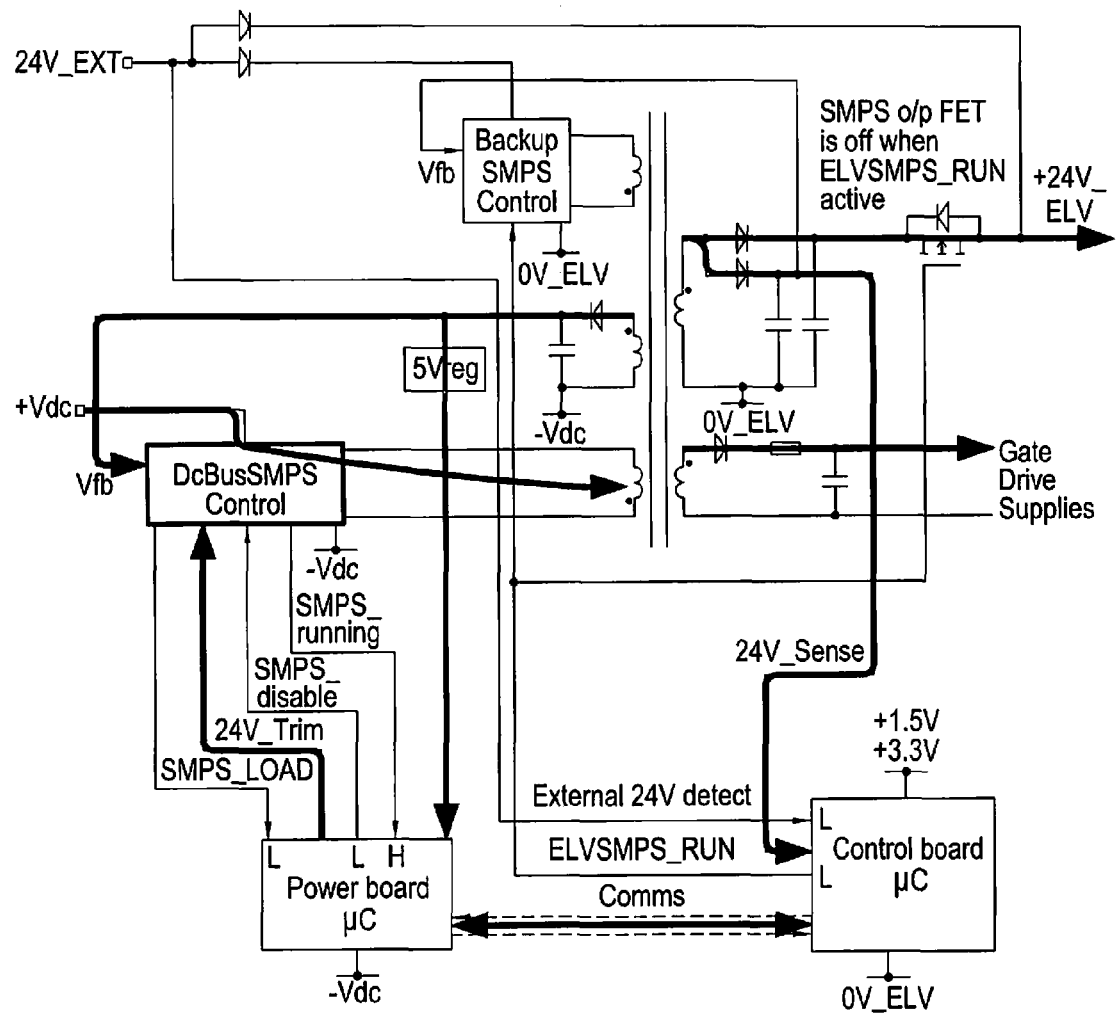
FIG. 2 illustrates current flow and control signals through the system shown in FIG. 1 when the system is driven by a main SMPS of the system.

The operation of the system 100 when operating in a normal mode of operation and power is supplied from power supply 200 through the main SMPS 101 shall now be discussed in detail. Reference should also be made to FIG. 2, which shows the current flow around the system shown in FIG. 1 when in the normal operating mode.

In this mode, the main SMPS operates like a conventional SMPS but with an output voltage train circuit provided by the action of the microcontrollers.

In this mode of operation the main SMPS 101 is actively processing power received from the main power source 200, which the transformer 110 then supplies to all parts of the system 100. The CμC 106 knows that the main SMPS 101 is ON from monitoring signals received from the PμC 105 and therefore holds the ELVSMPS_RUN signal low so that the back-up SMPS 102 remains inactive. The hardware Vfb signal performs basic regulation of the main SMPS 101, which is trimmed up, if required, by the micro-controllers 105, 106.

In this mode of operation the system 100 starts-up from complete shut-down as follows. The input supply voltage Vdc rises from zero to the maximum input voltage provided by the main power source 200. Current from DC bus capacitor voltage balancing resistors (not shown) of the main power source 200 is fed into a capacitor on a controller chip (not shown) of the main SMPS 101. When the capacitor voltage is high enough, the SMPS controller chip starts producing PWM signals which start to toggle a power switch TRI FIG. 5 of the main SMPS 101 and as a consequence, power is fed to the transformer 110 when the power switch is ON. The voltage at each transformer 110 output therefore rises in accordance with the applied input voltage.

Once 5V is supplied to the PμC 105, the PμC 105 is initiated and waits for communications from the CμC 106. Once communications have been established between the PμC 105 and CμC 106, the CμC 106 monitors the ELV output and if a voltage less than a lower threshold of an acceptable ELV output voltage range is detected, the CμC 106 will send a control message to the PμC 105 to increase the duty cycle of the main SMPS in accordance with the 24V_Trim signal. If communications are inactive between the two microcontrollers, then the main SMPS continues to work stand-alone.

The system 100 is also arranged to provide an overvoltage mechanism in order to protect the system 100 from dangerously high voltages being received from the main power supply 200. The PμC 105 monitors the main power supply 200 and if the voltage across the main power supply 200 exceeds an over voltage trip level, then the SMPS_disable line is taken high by the PμC. This causes the power supply to the system 100 to fail including the supply to the PμC 105. If the input voltage stays high, the main SMPS 101 will then enter a hiccup mode repetitively starting and stopping. A hardware circuit may be provided to prevent the FET from switching if the hiccup mode fails to prevent the main SMPS 101 from continuing to operate.

The system 100 is also arranged to deal with over-current detected at the output of the system 100. The PμC 105 monitors the SMPS_Load signal, which corresponds to a COMP pin of an SMPS controller chip, such as the UC2844. If a maximum current threshold is exceeded, the SMPS_disable line is taken high by the PμC 105. This causes the power supply to the system 100 to fail, including the supply to the PμC 105. Assuming the overload condition remains, the main SMPS 101 enters a hiccup mode repetitively starting and stopping. This hiccup mode limits the power dissipation in the circuit.

Figure 3:
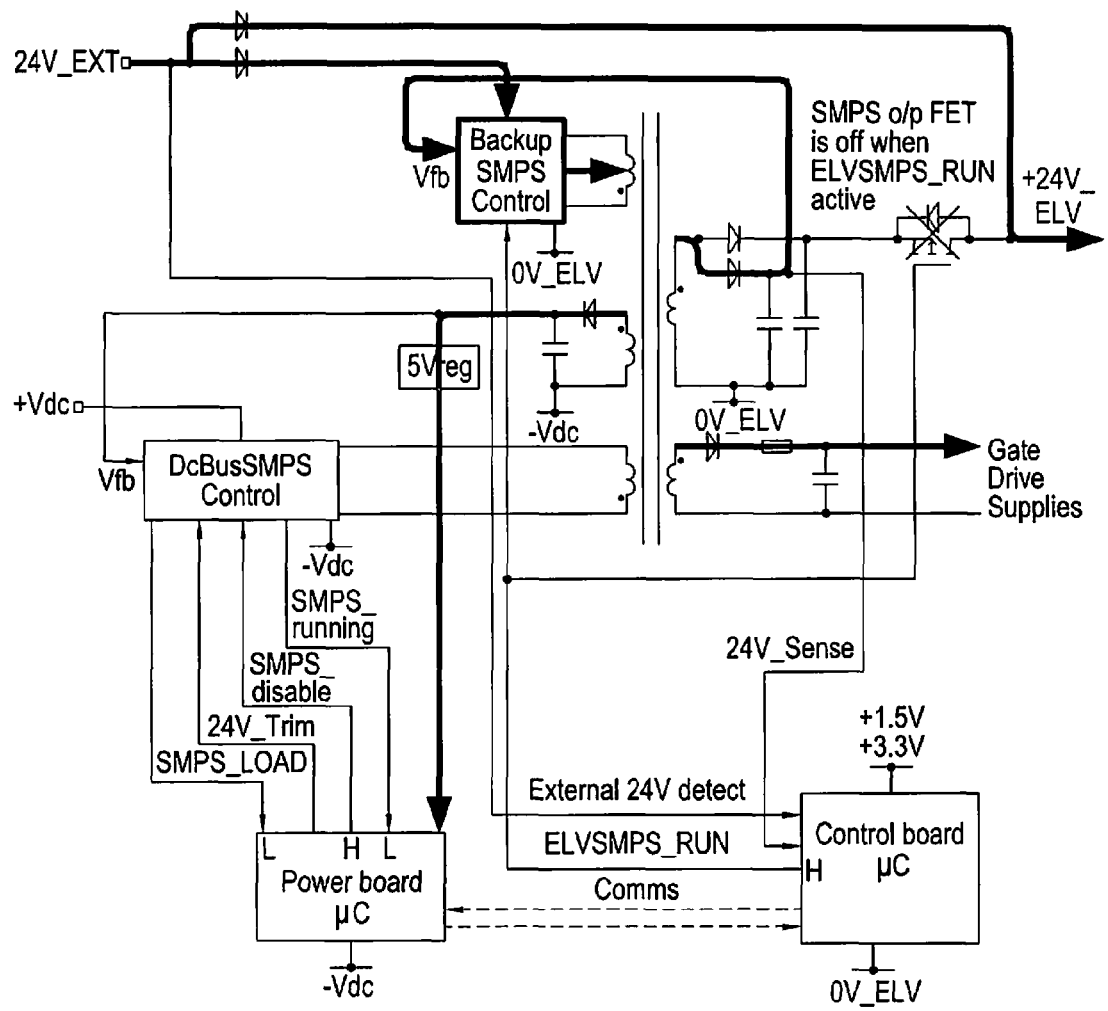
FIG. 3 illustrates current flow and control signals through the system shown in FIG. 1 when the system is driven by a back-up SMPS of the system.

The operation of system 100 when power is supplied to the system via the back-up supply 102, i.e. when the system is operating in the low voltage DC mode, will now be explained. Reference should also be made to FIG. 3, which illustrates the current flow in the system 100 of FIG. 1 when operating in the low voltage mode.

The main SMPS 101 is disabled by the PµC 105 whenever the low voltage DC mode is enabled. Hence, in the low voltage DC mode the system 100 will only run if the back-up supply 300 is present.

During start-up, since the main SMPS 101 runs by default, the main SMPS 101 will run for long enough for the microcontrollers 105, 106 to start and detect that the back-up power supply is present.

If the main power supply 200 is determined not to be driving the system 100, or at least not driving the system sufficiently well, then the PµC 105 disables the main SMPS 101 and then enables the back-up SMPS 102. In such circumstances the user backup 24V supply 300 must be provided with enough power to run all the requirements of the load on 104 and 103.

In the event that the main power supply 200 is not present, as long as the ELVSMPS_RUN signal is high, indicating that the back-up power supply 300 is present, the back-up SMPS 102 will attempt to run. If the back-up power supply's voltage drops below the required output voltage, the system 100 will power-down.

If the load is too high when in the low voltage mode of operation, and as a consequence the current is too high, the back-up supply 300 is arranged to reach a current limit and as a result the output voltage collapses as the current increases. The CµC 106 then monitors the output voltage and shuts-down the system 100 if the monitored voltage is too low.

In the event that on start-up, the main SMPS 101 is not able to operate because the main power supply 200 is supplying too low a voltage for the main SMPS 101 to run, the system 100 starts up as follows, provided the back-up supply 300 is present and low voltage mode is enabled.

The voltage of the back-up supply 300 rises from zero, charging-up the internal capacitors of the back-up supply 300, until the maximum 24V voltage of the back-up supply 300 is reached. Once the voltage supplied by the back-up supply 300 is sufficiently high the CµC 106 becomes active. Since the low-voltage mode parameter had previously been configured, the CµC 106 recognises that there are no communications with the PµC 105 and assumes that Vdc is low. The CµC 106 takes the ELV_SMPS_RUN signal high to enable the back-up SMPS 102. Then the back-up SMPS 102 operates and runs as previously described.

Figure 4:
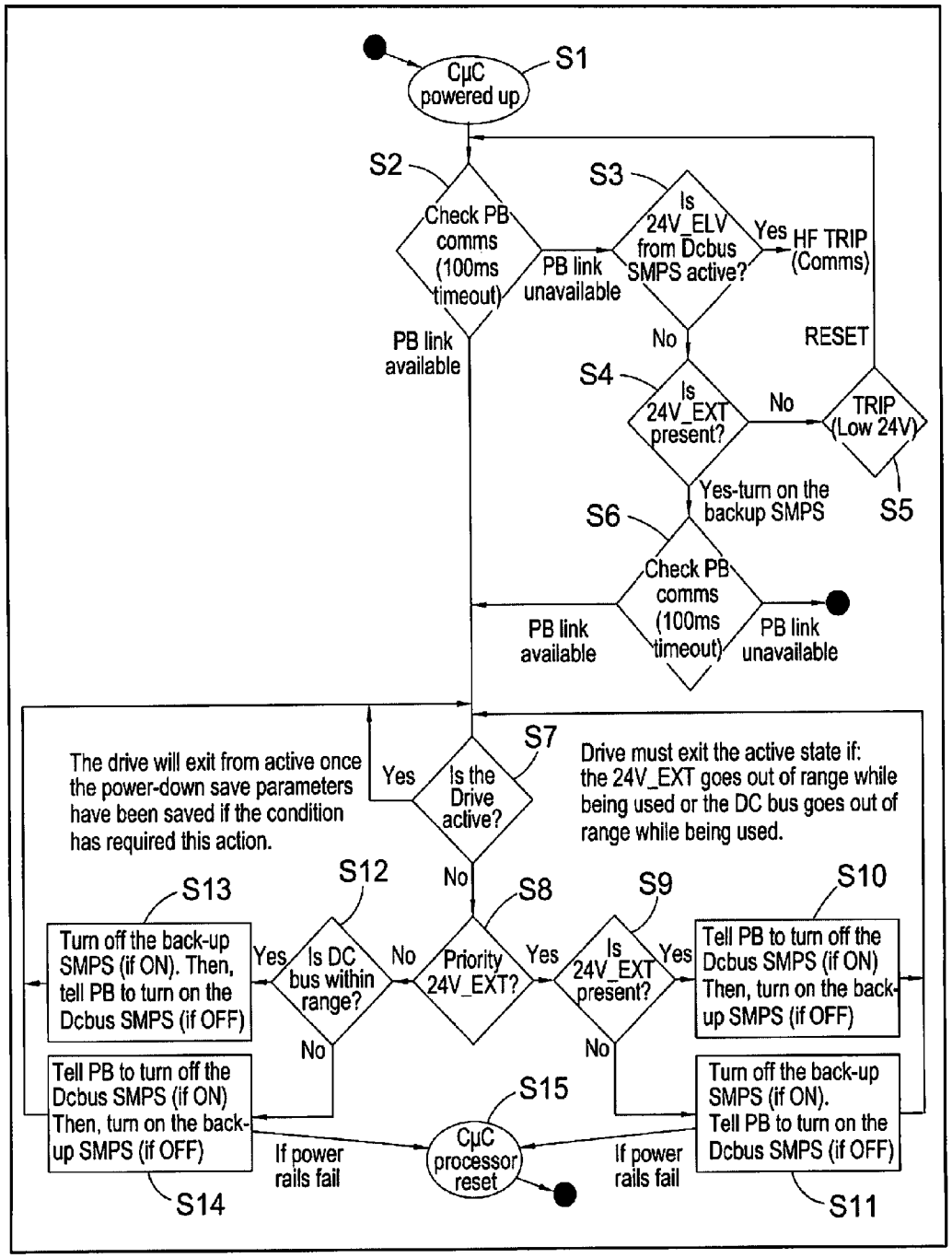
FIG. 4 is a flow diagram showing the processing steps performed by the Control Board microcontroller of FIG. 1.

FIG. 4 shows the sequencing operation of the CµC 106, which as discussed above, acts as a controller for both the back-up SMPS 102 and the PµC 105. The CµC 106 effectively acts as the main controller for the whole system 100. A brief description of the states shown in FIG. 4 now follows.

S1 is the initial state which occurs either at power up or when the CuP processor is reset.

S2 shows the first decision which determines whether power has already been provided by the main power supply under the control of 105. The initial condition for 102 is not to provide power. The initial condition for the 101 is to provide power from the dc bus (200) thus if adequate voltage is provided on 200, 105 will be powered via the winding 115 and the 5V reg., and 106 will be powered either through +24V_ELV winding or the 24V_Ext (300). S2 is thus determined by trying to establish communications between 106 and 105, if communication is established then there must be power from 200.

S3 tests for voltage on the transformer winding 114. If there is adequate voltage there must be a fault in the communications line between 105 and 106 so the drive will trip HF (hardware fault).

S4 tests for voltage from 24V_EXT (300). If there is not adequate voltage the drive cannot operate so trips passing through S5.

S5 returns the sequence to S2.

S6 checks the communication between 105 and 106 having turned on the backup supply 102 when changing from state S4.

S7 checks whether the drive is active as there must not be a change between which primary is active while the drive is running as there will be a drop in the gate drive supplies (fed from winding 113) while the change takes place. S8 checks whether the user has elected to permanently run from the backup supply (102).

S9 tests for voltage from 24V_EXT (300). If there is not adequate voltage, move to S11 where the backup SMPS (102) is turned off and then the main SMPS (102) turn on. Else move to S10.

S10 turns off the main SMPS (101) and then turns on the backup SMPS (102).

S11 If there is not adequate voltage (200) feeding the main SMPS (101) the drive will power down and thus move to S15 to reset. Else return to S7.

S12 tests for voltage from the dc bus (200). If there is not adequate voltage, move to S14 where the main SMPS (101) is turned off and the backup SMPS (102) is turned on. Else move to S13.

S13 turn off the backup SMPS (102) and then turn on the main SMPS (101).

S14 If there is not adequate voltage (300) feeding the backup SMPS (102) the drive will power down and thus move to S15 to reset. Else return to S7.

S15 returns to S1 when power is restored.

A more detailed operational description now follows.

At step S1, the CµC 106 is powered up.

Then, at step S2 the CµC 106 determines if the PµC 105 is in communication with the CµC 106. FIG. 4 refers to a 100 ms timeout. This is the time during which the system tries to establish communication between 105 and 106. The state is either left when communication has been establish before the 100 ms timeout has elapsed, or at the end of the 100 ms timeout.

If, in step S2, it is determined that the communication link with the PµC 105 is unavailable, the CµC 106 determines at step S3 if the 24V ELV from the main SMPS 101 is active. If the main SMPS 101 is not supplying the 24V ELV output, then at step S4 the CµC 106 determines if the 24V ELV output is present at all. If no ELV output is detected, the system 100 is tripped at step S5, and returns to the initial start-up state. If the 24V output is present, then the back-up SMPS 102 is turned ON and a further check is carried out at step S6 in order to determine if the communications link between the PµC 105 and CµC 106 is available. If the link is not available, the process returns to S1. If the communication link is available, the process proceeds to step S7, as it does if the initial determination made at step S2 determines that the link is available. If the communication link is available, the process proceeds to step S7, as it does if the initial determination made at step S2 determines that the link is available.

At step S7, a determination is made as to whether the main SMPS 101 is active. If the main SMPS 101 is active, then the system 100 will continue to monitor whether or not the main SMPS 101 is active and remain in normal operation, until an inactive state is reached. The system 100 only exits the active state in specific circumstances, as discussed previously, for example, if the ELV output goes out of range while being used, or the main power supply 200 goes out of range while being used.

When an inactive state is reached the system 100 attempts to enter the low voltage operating state. At step S8, a determination is made as to whether the 24V ELV output is a priority. If the 24V ELV output is a priority then, at step S9, if the 24V ELV is present, and if the ELV output is present, and therefore the inactive state has been entered due to the main power supply 200 going out of range, then the CµC 106 instructs the PµC to turn OFF the main SMPS 101, and then the CµC 106 turns the back-up SMPS 1020N at step S10. If the CµC knows that the currently request SMPS is not receiving a supply then it automatically swaps to the other SMPS in the hope that it is being supplied. Else the system will run out of power and move to S15

If at step S8, it is determined that the ELV output is not a priority, then at step S12 a determination is made as to whether the main power source 200 is within the predetermined operating range. If the main power source 200 is not within range, the main SMPS (101) is turned off then the backup SMPS (102) turned on. Again this with the aim that there is a supply (300) into the backup SMPS. Otherwise the system will lose power and enter state S15]. If the main power supply 200 is not within range, then the CµC 106 instructs the PµC 105 to turn ON the back-up SMPS 102.

If at steps S14 or S15 the power supplied to the system 100 fails, the CµC 106 is reset, and the process starts again.

Figure 5:
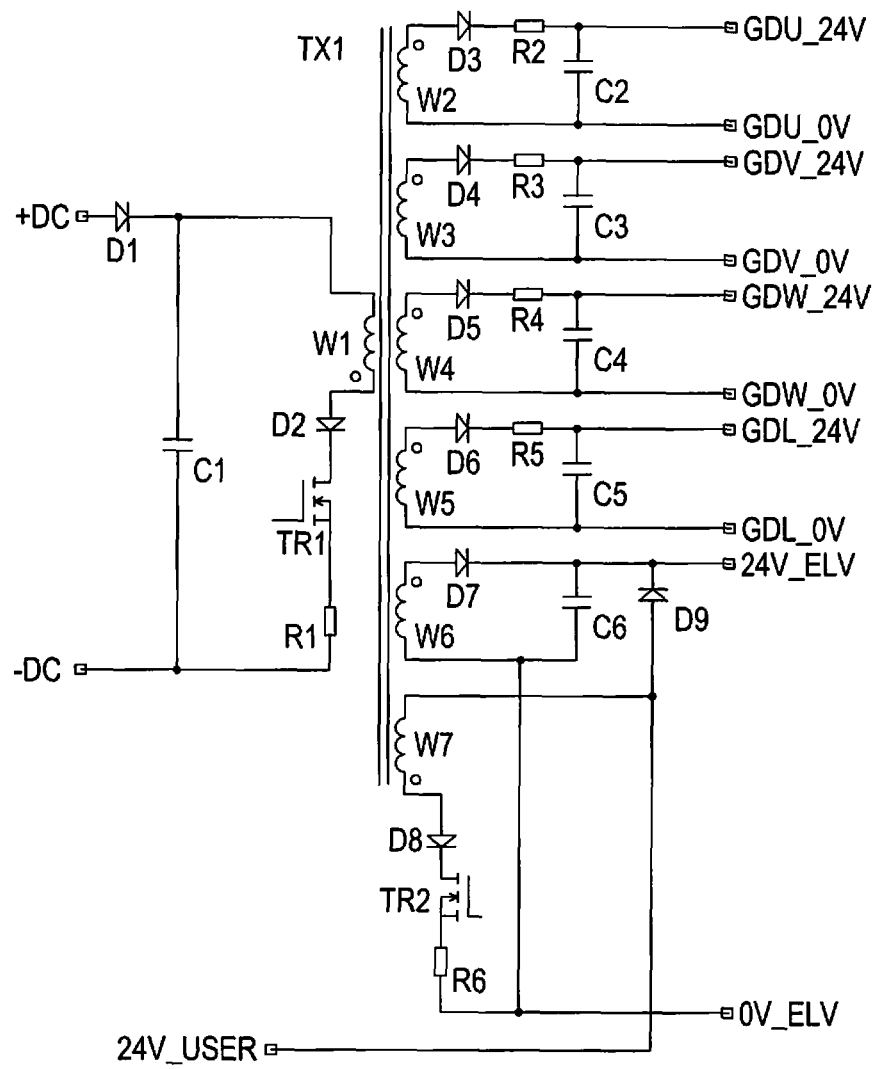
FIG. 5 is a circuit diagram of an implementation of power components of a dual-source SMPS system.

FIG. 5 shows an example implementable circuit similar to that of FIG. 1. However, in FIG. 5 some of the main and back-up SMPS circuitry is illustrated and the control circuitry is not.

The system comprises: transformer TX1; main SMPS, which includes diode D1, capacitor C1, transformer winding W1, diode D2, transistor TR1 and resistor R1; back-up SMPS, which includes winding W7, diode D8, transistor TR2, and resistor R6; ELV output circuit, which includes transformer winding W6, capacitor C6, diode D7, and diode D9; and main output circuit including transformer windings W2 to W5, diodes D3 to D6, resistors R2 to R5, and capacitors C2 to C5.

In the main SMPS, capacitor C1 is connected in parallel with the following components, which are each connected in series: transformer winding W1, diode D2, transistor TR1 and resistor R1. Power is supplied across capacitor C1 from a main power source, with a diode provided at a +DC terminal of the power supply to prevent power from the transformer TX1 returning to the power supply. Capacitor C1 is a de-coupling capacitor arranged to make the impedence of the input power source appear lower. The transformer winding W1 delivers the input power to the transformer TX1. TR1 is the SMPS power switch, and is activated by an SMPS controller, which determines the duty cycle of the main SMPS. The resistor R1 is a shunt resistor for measuring the current flowing through TR1.

In the back-up SMPS, the 24V input voltage received from the back-up power source is placed across the transformer winding W7, the diode D8, the transistor TR2, and resistor R6, which are all arranged in series. Switch TR2 is the power switch of the back-up SMPS and when switch TR2 is ON power is delivered to the transformer TX1 via the transformer winding W7. It can be seen that the main SMPS active parts are W1, TR1 and R1 on the primary of TX1. The active parts of the backup SMPS are W7, TR2 and R6. When the back-up SMPS is active, the capacitor C1 gets charges due to an antiparallel body diode (not shown) of TR1. The microcontroller 105, 206 then senses that the DC bus voltage is adequate to turn on the main SMPS and then turns on the main SMPR and instructs the back-up SMPS to stop. As then energy stored in the capacitor C1 is quite limited, the voltage across the capacitor C1 rapidly collapses. This results in the microcontroller instructing the back-up SMPS to start again. This process may continue indefinitely, pushing the system into a hiccup mode, until any efforts are made to stop charging the capacitor C1. As the current to charge the capacitor C1 is flowing through the antiparallel body diode of the TR1, TR1 is heated up. Diodes D2 and D8 are provided to act as blocking diodes to avoid the above situation occurring. D1, D2 and D8 are needed to make sure that when, for example, the main SMPS is active, current from the main SMPS does not flow into the backup SMPS. The same is true, that the current from the backup SMPS does not flow into the main SMPS if the backup SMPS is active.

The main output circuit is formed from W6, D7 and C6. This circuit is a conventional rectification and smoothing circuit as used on many other SMPS's The low voltage output circuit is arranged to have power induced in its winding W6 from the transformer TX1. The voltage induced across the winding W6 is then delivered to the load via smoothing capacitor C6.

A precision voltage shunt reference is used to provide reference voltage (Vref) to an Analog to Digital converter (ADC) in the microcontroller (PµC). Voltage regulator (5Vreg) which is used to power the micro controller is controlled by the voltage shunt reference, so as to get low noise on the power supply of the microcontroller (PµC) 105,106. This in return helps to increase the Effective Number of Bits (ENOB) of the ADC system. Generally, due to noise in the power supply, the lower conversion data and the upper most data of the ADC is discarded.

It will be appreciated that in alternative embodiments of the invention only a single microcontroller is provided and arranged to perform the functionality of both the PµC and CµC.

It will be appreciated that while the different embodiments of the invention and examples set-out above have been described separately, each of those examples and/or embodiments can be combined, where appropriate. In particular, the above-description is provided as an example only, and as such the scope of the invention is only limited by the appended claims.

The invention claimed is:

1. A power conversion system comprising:
   a transformer comprising first, second, and third inductive coupling elements;
   a first power supply arranged to provide a voltage across the first coupling element;
   a second power supply arranged to provide a voltage across the second coupling element;
   an output arranged to receive a voltage from the third coupling element, wherein, in use, the voltage across the first coupling element and the voltage across the second coupling element are arranged to induce a voltage in the third coupling element; and a control arranged to independently control the operation of the first and second power supplies, the control arranged to control the first and second power supplies so that when one of the first and second power supplies is active the other of the first and second power supplies is inactive and to disable the first power supply and activate the second power supply when the first power supply is unable to provide a target output voltage at the output.

2. The system according to claim 1, wherein the first power supply is controlled by a first control signal received from the control and the second power supply is controlled by a second control signal received from the control.

3. The system according to claim 1, wherein the control is arranged to disable the currently active power supply of the first and second power supplies before activating the currently inactive power supply of the first and second power supplies.

4. The system according to claim 1, wherein the control is arranged to disable the first power supply and activate the second power supply when the first power supply is inoperable.

5. The system according to claim 4, wherein the control is arranged to determine that the first power supply inoperable when the first power supply fails to provide the voltage across the first coupling element.

6. The system according to claim 1, wherein the control is arranged to monitor a voltage at the output and the control is arranged to determine that the first power supply is unable to provide the target output voltage at the output when the output voltage falls below a minimum target output voltage threshold.

7. The system according to claim 1, wherein the first power supply is a main power supply and the second power supply is a back-up power supply.

8. The system according to claim 1, wherein the first power supply provides a high voltage across the first coupling element relative to the voltage provided by the second power supply across the second coupling element.

9. The system according to claim 1, wherein the transformer further comprises a fourth coupling element, and the system further comprises a low voltage output arranged to receive a voltage from the fourth coupling element, wherein, in use, the first and second coupling elements are arranged to induce the voltage across the fourth coupling element, and wherein the third and fourth coupling elements are arranged so that the voltage induced across the fourth coupling element is less than the voltage induced across the third coupling element.

10. The system according to claim 9, wherein the low voltage output is an extra-low voltage, ELV, output.

11. The system according to claim 9, wherein the low voltage output is arranged to power one or more components of the system.

12. The system according to claim 10, wherein the control is powered, at least in part, by the low voltage output.

13. The system according to claim 1, wherein the control comprises a first controller arranged to control the first power supply, and a second controller arranged to control the second power supply, wherein the first and second controllers are communicatively coupled.

14. The system according to claim 13, wherein one of the first and second controllers is a master controller and the other of the first and second controllers is a slave controller, wherein the master controller controls the slave controller.

15. The system according to claim 14, wherein the second controller is the master controller, and the first controller is the slave controller.

16. The system according to claim 1, wherein the first and second power supplies are switched-mode power supplies.

17. The system according to claim 1, wherein the first and second power supplies are arranged to receive power from first and second power sources, respectively.

18. The system according to claim 1, wherein the first and second power supplies are electrically separate circuits.

19. The system according to claim 7, wherein the first power supply is a 3-phase AC 575V (800V DC) or 3-phase AC 200V (280V DC) power supply.

* * * * *